Oct. 2, 1928.  1,685,973

R. B. ALEXANDER ET AL

TESTING APPARATUS

Filed May 23, 1925 3 Sheets-Sheet 1

INVENTORS
ROLAND B. ALEXANDER &
WILLIAM H. ROWAN
BY
ATTORNEYS

Oct. 2, 1928.

R. B. ALEXANDER ET AL 1,685,973

TESTING APPARATUS

Filed May 23, 1925

INVENTORS
ROLAND B. ALEXANDER &
WILLIAM H. ROWAN
BY

ATTORNEYS

Oct. 2, 1928.

R. B. ALEXANDER ET AL 1,685,973

TESTING APPARATUS

Filed May 23, 1925  3 Sheets-Sheet 3

INVENTORS
ROLAND B. ALEXANDER &
WILLIAM H. ROWAN
BY
ATTORNEYS

Patented Oct. 2, 1928.

1,685,973

UNITED STATES PATENT OFFICE.

ROLAND B. ALEXANDER AND WILLIAM HOWARD ROWAN, OF DETROIT, MICHIGAN.

TESTING APPARATUS.

Application filed May 23, 1925. Serial No. 32,374.

The invention relates to testing apparatus and more particularly to means for determining the characteristics of materials when subjected to heat treatment. It is well known that when materials, as, for example, steels, are subjected to heating or cooling, certain changes in physical characteristics occur at certain definite temperatures which may be termed transformation points or critical temperatures. The determination of these temperatures is important in order to serve as a guide for treatment of products made from the given materials for the purpose of developing therein the properties which are attainable by heat treatment.

The principal object of the invention, therefore, is to provide means for determining the temperatures at which the physical changes under investigation take place.

A further object is to provide means for recording the changes which indicate the critical temperatures with reference to a specimen under examination.

A further object is to provide means for rendering the performance of a given test wholly automatic subsequent to the preliminary stages, so that the heating of the specimen to a predetermined temperature, the interruption of the heating, the recording of the variations in rate of heating or cooling of the test specimen as compared with a standard specimen, and the discontinuing of the operation of the apparatus and termination of the test may be accomplished without attention of the operator.

Further objects and advantages will appear from the following description taken in connection with the accompanying drawings in which Figure 1 is a front elevation of parts of an apparatus embodying our invention;

Figure 1:
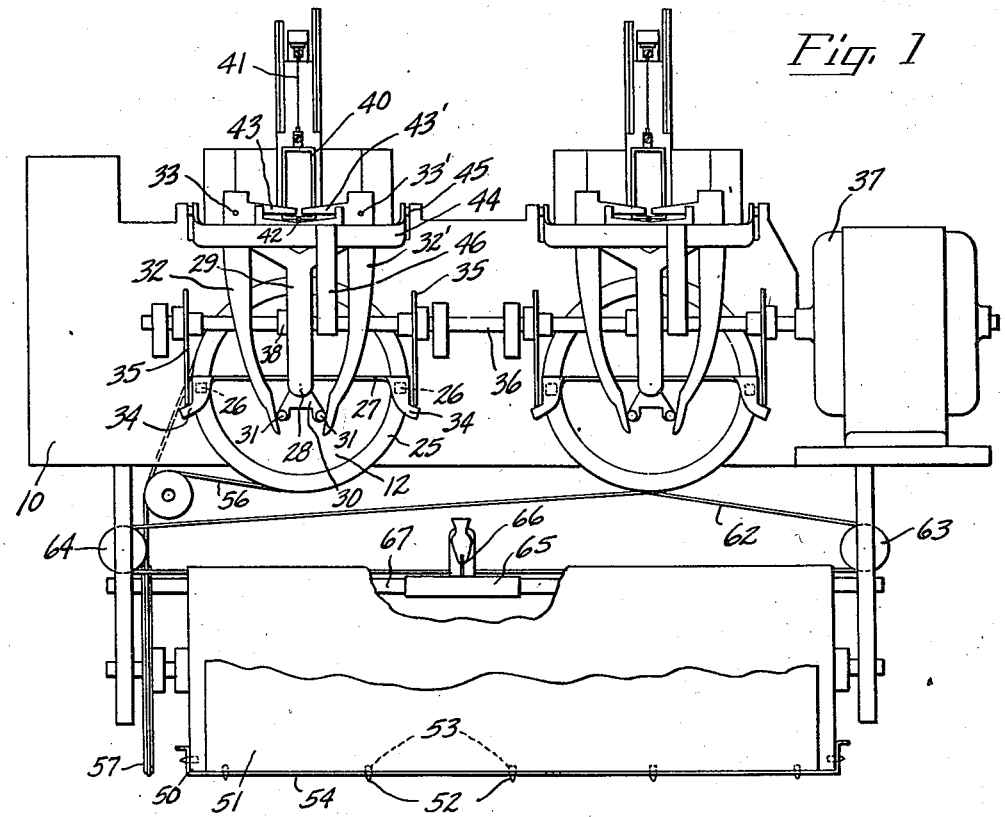

Referring to the drawings, 10 indicates a frame on which are mounted two instruments of the self-balancing potentiometer type. As these instruments are similar and are individually of a well known type the description will be confined mainly to the one shown at the left on Figures 1 and 2. This includes a shaft 11, to the front end of which is secured a clutch wheel 12. At the rear end of the shaft are two contact disks 13, 14, of electrical insulating material which are adjustable angularly around the shaft and may be clamped in adjusted position by nut 15 engaging with a threaded portion of shaft 11 and adapted to exert pressure against collar 16 fixed to the shaft. Contact strips 17, 18, are positioned on the periphery of disks 13, 14, respectively, and contacts carried by spring members 19, 20, are arranged to bear upon the contact strips 17, 18, respectively, so that when, by the rotation of the disks 13, 14, the contact strips pass from under the contacts, the circuits connected to the respective pairs of contact members will be interrupted.

To the central portion of the shaft 11 is fixed a grooved pulley 21 and a drum 22. Upon the periphery of the drum and insulated therefrom is a slide wire resistance member 23. A contact member 24 engages with the resistance wire 23 and slides thereover as the drum 22 is rotated.

On the front of clutch disk 12 adjacent the periphery of the disk is a projecting ring 25 with the face of which clutch blocks 26 are adapted to engage. The blocks 26 are carried on the opposite ends of a double armed lever 27 pivoted at 28 on a swinging frame 29. A plate 30 rigid with the lever 27 carries two pins 31 arranged to engage with the extremities of levers 32, 32', pivoted respectively at 33, 33'. Any pivotal movement, therefore, of levers 32, 32', will act to swing the lever 27 about its pivot 28. The extreme ends of lever 27 are formed with hooks or fingers 34 positioned in the paths of cams 35 mounted upon a shaft 36. This shaft is driven by a suitable constant speed device as electric motor 37. Upon the shaft 36 is another cam 38 positioned to operate against the swinging frame 29 which is pivotally supported as at 39. With each revolution of the shaft 36 therefore the frame 29 and parts carried thereby, including the clutch lever 27, is moved away from the clutch disk, thus causing disengagement of the clutch members 26 and 25. While in this position the levers 32, 32', are actuated to swing the clutch lever by engagement with the pins 31, thus bringing the clutch blocks 26 to a new position on the clutch disk face 25 when the swinging frame 29 is again lowered. The position of cams 35 relatively to cam 38 is such that the cams 35 engage with fingers 34 only after the swinging frame has been lowered. The further rotation of the cams 35 will then operate to return clutch lever 27 to its horizontal position, and thus rotate clutch disk 12 and the parts connected thereto through an arc the extent of which depends upon the extent of displacement to which the clutch lever has been subjected.

The means for swinging the levers 32, 32' and thus determining the adjustment of clutch lever 27 is controlled by galvanometer 40. The galvanometer comprises a coil positioned as usual, between the poles of a magnet and suspended by lead wire 41. A needle or pointer 42 rigidly connected to the oscillatory coil extends forwardly and lies, when the coil is in normal position, just below the gap between the ends of arms 43, 43', extending toward each other from the levers 32, 32'. Deflection of the coil will bring the pointer under one or the other of the arms 43, 43'.

Figure 7:
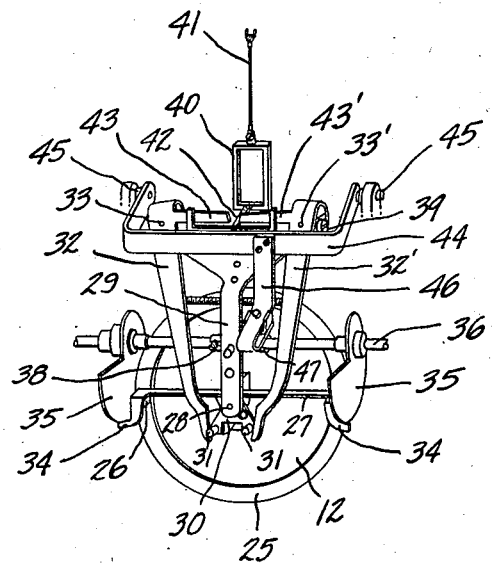
Figure 7 is a perspective view showing a part of the recording apparatus of Figures 1 and 2.

A bar 44 pivotally supported at 45 lies just below the end of pointer 42. This bar is provided with a downward extension 46 which is adapted to rest against a cam 47 (Figure 7) on shaft 36. When the bar 44 is lifted, through actuation of the arm 46 by the cam 47, the end of the pointer 42 will be raised slightly, and if at this time the pointer lies below one of the arms 43, 43', the latter will also be lifted thereby swinging the corresponding levers 32 and 32' about their pivots 33 and 33'. The cam 47 is so positioned on shaft 36 that the action just described takes place at the time when the swinging frame 29 has been actuated to disengage the clutch members 25, 26. Thus no strain is placed upon the galvanometer pointer except that necessary to swing the levers 32, 32', and position the clutch lever 27.

It will be understood that the galvanometer will be so connected relatively to a standard source of current and a source of current varying with conditions under investigation that deflection takes place in accordance with variations in the latter current. This deflection results, through the mechanism above described, in rotating the shaft 11 and thereby changing the position of contact 24 on slide wire 23. The resistances in the two circuits are thus readjusted, which action continues until a balance is reached, after which the galvanometer deflection ceases.

The rotation of shaft 11 to restore the balance in the circuits mentioned is further utilized to position indicating means which is preferably of the recording type. This means may include a roller 50 on which a record sheet 51 may be mounted. The sheet is positioned on the roller by engagement of pins 52 with apertures 53 in the ends of the sheet, which is preferably of length sufficient to extend around the roller and engage at both ends with the pins. By this means the initial position of the sheet relative to the roller is fixed, and a sheet may be used which is graduated circumferentially in degrees of temperature. A clip 54 serves to hold the sheet on the roller. The roller is actuated by a flexible member 56 passing around the grooved pulley 21 on shaft 11 and around a pulley 57 fixed on the shaft of the roller. Thus movement of the shaft 11 in either direction will result in rotation of the roller and record sheet to an extent dependent upon the variation between the currents in the circuits under investigation.

Figure 2:
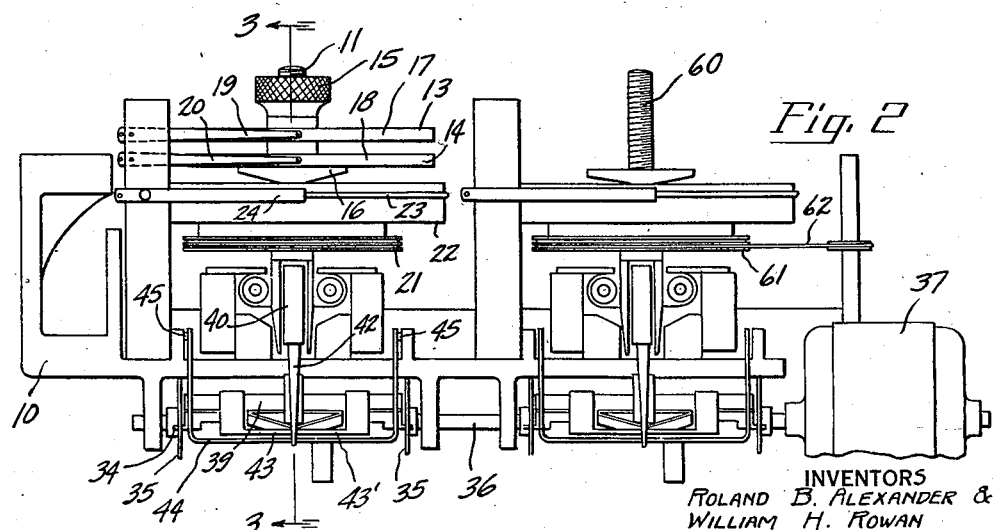
Figure 2 is a plan view of the mechanism shown in Figure 1.

The second instrument shown on the right of Figures 1 and 2 and including the shaft 60 is or may be substantially identical, so far as the self balancing potentiometer structure is concerned, with that already described. The pulley 61, corresponding with pulley 21 of the other instrument, is arranged, however, to actuate a belt or flexible member 62 passing over guide pulleys 63, 64, and connected to carriage 65 carrying a recording pen 66 and reciprocable on a guide or track 67. The rotation of shaft 60 is therefore utilized to cause the pen 66 to travel across the record sheet 56.

For the principal purposes of our invention the instrument including shaft 11 will be so connected to the actuating circuits that the rotative movement of shaft 11 and hence of roller 50 will be responsive to temperature changes in a test specimen under observation. The connections are such that the front of the roller moves downwardly as the temperature rises and the record sheet is so graduated relatively to the calibration of the slide wire that the actual temperature of the specimen is indicated by the position of the pen circumferentially of the roller. The instrument including shaft 60 is connected to another circuit which preferably responds to variations in relative temperatures of the test specimen and of a standard, such, for example, as a neutral body having no "critical" temperatures. The traverse of the pen will then be indicative of the occurrence of critical temperatures or "transformation" points where structural changes occur in the constitution of the material of the test specimen. The curve traced by the pen will then be an accurate graph of temperature, (ordinates) versus differential temperature, (abscissæ), and any sudden evolution or absorption of heat in the specimen will be evidenced by more or less sharp changes in the direction of the curve.

The investigation may be directed, of course, both to the heating and cooling of the specimen and the curve traced by the pen may therefore ascend to a certain temperature indication and then descend as far as it is desired to carry the test. In order to predetermine the limits between which the record is made means is provided to interrupt the heating of the specimen after it has reached a predetermined temperature and to interrupt the operation of the recording mechanism after cooling has proceeded to a predetermined temperature. This is attained by the contacts 19, 20, operating upon the contact strips 17, 18, respectively. One pair of contacts, for example, 19, 17, is connected in a circuit including means for effecting discontinuance of the heating operation at a predetermined upper temperature limit. This may be accomplished, for example, in case electrical energy is utilized for heating by connecting the contacts 19, 17 in circuit with a relay adapted to open the circuit to the heating furnace. When the contacts are disengaged by rotation of shaft 11 to a predetermined extent the application of heat will then be interrupted and the test specimen will begin to cool, the rate of cooling being determined by the rate of loss of heat from the furnace.

The contacts 20, 18, may be connected in the circuit of motor 37 and arranged to interrupt the supply of current to the motor when the shaft 11 has returned to a position corresponding to a predetermined lower temperature limit. Thus the test may be limited to cover a certain range of temperatures and the change from the heating to the cooling stage as well as the termination of the test are effected without attention on the part of the operator.

Figure 5:
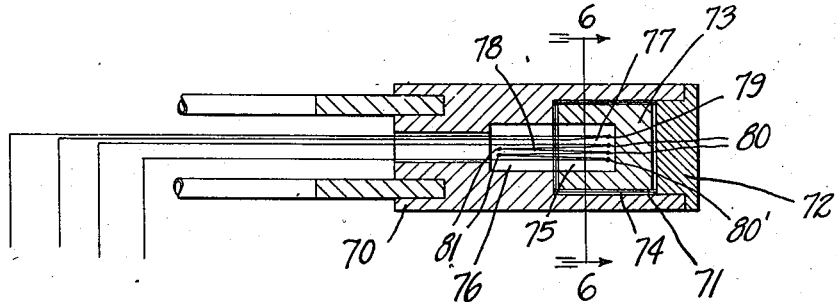
Figure 5 is a sectional view showing the arrangement of parts in the heating apparatus.
Figure 6:
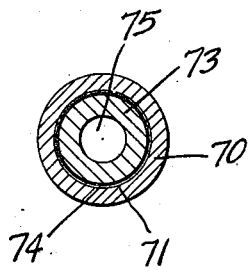
Figure 6 is a section on line 6—6 of Figure 5.

The specimen under investigation may be arranged as shown in Figures 5 and 6 in which 70 indicates a neutral body, i. e., one of a material which has no "critical" temperatures or in which the rate of heating and cooling is substantially uniform under substantially constant gain or loss in heat energy. Nickel is a suitable material for this purpose. The body 70 is provided with a cavity 71 adapted to be closed by a cap 72 and to receive a specimen 73 of the material to be tested, for example, a steel. The cavity 71 may be lined with insulating material 74, such as mica. The specimen 73 is provided with a central cavity 75 registering with another cavity 76 in the body 70 communicating with the cavity 71. The cavities 75 and 76 thus constitute a chamber within which are positioned the thermocouple wires 77, 78. The wires 77 have a single junction 79 adapted to be positioned in proximity to the specimen 73 at the base of the cavity 75. The wires 78 are provided with a plurality of junctions 80 adapted to lie near the base of cavity 75, and also with junctions 81 to be positioned at the base of cavity 76. The number of junctions 80 is the same as the number of junctions 81 and the wires are so arranged that the junctions 80 and 81 alternate in series. The last one of the junctions adjacent to the specimen, as at 80', is a junction of similar instead of dissimilar metals, i. e., it serves simply as a connection to a lead wire of the same material as the nearest wire of the last junction 81. Thus the lead wires from the multiple thermocouple are both of the same material. Since the number of thermal junctions in the neutral body and in the specimen is the same the voltage generated by one junction, as 80, will be opposed by that generated in the next junction as 81. Thus the resultant voltage will depend merely upon the difference in temperature between the bodies 70 and 73, but the differential effect will be increased by reason of the use of a plurality of couples in series. Thus we are enabled to use couples of relatively low sensitivity and cost, such, for example, as chromel-alumel couples, chromel being a nickel-chromium alloy and alumel an aluminum-iron alloy. Furthermore, the multiplication of the voltage by the series arrangement greatly increases the deflections of the recording instrument and thereby accentuates the indications of the transformation points.

Figure 4:
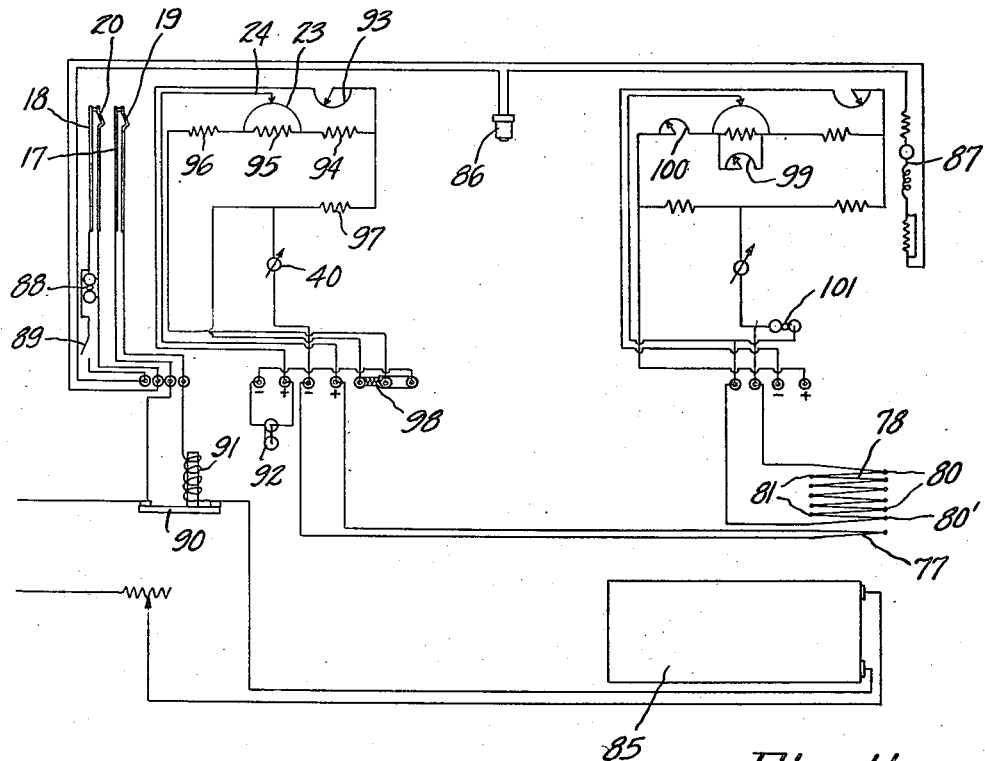
Figure 4 is a wiring diagram showing the electrical assembly.
Figure 3:
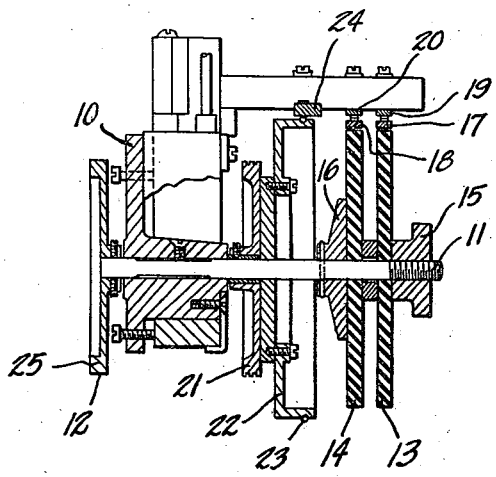
Figure 3 is a section on line 3—3 of Figure 2.

The neutral body and specimen may be heated in any suitable manner, an electric furnace or heating chamber 85 being shown conventionally in Figure 4.

In order to make a record of the properties under investigation the single thermocouple will be connected to the potentiometer shown at the left of Figure 1 so that the roller carrying the record sheet may be rotated through an angle varying with the actual temperature of the specimen. The multiple thermocouple will be similarly connected to the other potentiometer so that travel of the recording pen will take place in accordance with the difference in temperature between the neutral body and the specimen. The arrangement of connections is shown diagrammatically in Figure 4.

Referring to Figure 4, the motor circuit is connected to the plug 86, the motor windings being indicated at 87. In the same circuit are the contacts 20, 18, whose engagement is determined by the angular position of disk 14. A plug switch 88 bridges the contacts 18, 20, so that, the plug being in place and hand switch 89 being closed, the motor will be set in operation even though the contacts 18, 20, are not engaged. The plug will be left in place until the temperature rise, as determined by thermocouple 77, is sufficient to exceed the predetermined minimum at which it is desired to discontinue the record as the specimen cools. At this point the contacts 18, 20, will be engaged and the plug may therefore be removed. Then as the specimen cools to the predetermined extent the contacts 18, 20, will be again disengaged thereby breaking the motor circuit and interrupting further operation of the potentiometers and recording apparatus.

The heating circuit for the furnace or heating chamber 85 is arranged to be controlled by the contacts 17, 19, the engagement of which is determined by the angular position of disk 13. This control may be accomplished in any convenient manner, as by the provision of a switch 90 arranged to be manually closed and held closed by the holding coil 91 in series with the contacts 17, 19. When, therefore, the heating operation has been initiated by closing the switch 90 it will continue until, due to the rise of temperature controlling the rotation of disk 13, the contacts 17, 19, are disengaged, whereupon the switch 90 will open and interrupt the supply of heating current.

The potentiometer circuits for the left hand instrument include a source of current 92 which may be a pair of dry-cells in parallel. The battery circuit leads first through the rheostat 93 for standardizing the battery current, and then divides, one branch including the slide-wire bridging resistance 95 and regulating resistances 94, 96. The other branch includes resistance 97. The first branch includes a shunt leading from the slide-wire 23 through contact 24, thermocouple 77, and galvanometer 40. At 98 is interposed an automatic cold-junction coil commonly employed in instruments of this type to eliminate the effect of changes in room temperature.

It will be understood that by proper selection and adjustment of the various resistances the potential across the galvanometer may be initially brought to zero. Then when the thermocouple is heated the current generated therein will cause deflection of the galvanometer which results, through the mechanism above described, in movement of slide-wire 23 to readjust the resistances until the potential across the galvanometer is again reduced to zero.

The circuits of the right hand potentiometer are similar to those already described in the left hand instrument except that they are connected to the differential thermocouple 78 and the instrument therefore responds to differences only in the temperatures of the neutral body and the specimen. We have also found it of advantage to insert a variable resistance 99 across the slide-wire terminals so as to permit the sensitiveness of the instrument to be varied to determine the pen travel for given temperature differences, and to replace the resistance 96 with a variable resistance 100. More accurate initial setting of the recorder pen is thus attained and, if desired, the record sheet may be provided with a circumferential zero line upon which the pen will rest when there is no temperature difference affecting the multiple thermocouple. A switch 101 may also be inserted in the thermocouple circuit to disconnect the latter when desired.

It will be seen that with the assemblage described the movement of the record sheet support, as roller 50, is proportional to the actual temperature of the specimen while the lateral movement of the marking device or pen 66 is proportional to the difference in temperature between the specimen and the neutral body. The two movements are therefore indicative, both of the variations in the characteristics of the currents which act upon the two instruments and also of the variations in temperatures at two different points or of temperature and temperature difference respectively.

We claim:

1. Means for recording comparative temperature effects upon two bodies comprising means for subjecting both bodies to gradual heating means for measuring the temperature of one body, means for measuring the differences in temperature between the two bodies, and means for producing a record indication showing the continuous variations of both said measured quantities.

2. Structure as set forth in claim 1, the said record producing means including mechanism for moving a record surface in accordance with variations in one of said quantities and independent mechanism for traversing thereover a stylus in accordance with variations in the other quantity.

3. Means for determining transformation points in a specimen comprising, in combination with the specimen, a neutral body, means for applying heat uniformly to said bodies, means for determining the resultant temperature change of the neutral body, means for determining the differences in temperature between said body and said specimen, and means for continuously combining the indications of said determinations into a record.

4. Structure as set forth in claim 3, said record-producing means including mechanism for moving a record surface in accordance with the said temperature change in said neutral body and mechanism for moving a stylus thereover at an angle to the direction of movement of the record and to an extent corresponding to the said temperature differences.

5. Means for determining the transformation points of a specimen of steel or the like comprising means for subjecting the specimen and a body with which it is to be compared to gradual changes in temperature, means for continuously determining the temperature of the body, means for determining the differences in temperature between said body and said specimen, means for moving a record surface to an extent proportionate to the changes in temperature of the body and means for moving a marking device over said surface transversely to its direction of travel and to an extent proportionate to said differences of temperature.

6. The combination of two instruments each adapted to indicate the voltage of a source of electric current, a thermocouple connected to supply current to one of said instruments, another thermocouple connected to supply current independently of the first to the other instrument, and means for combining the indications of said instruments into a single indication.

7. The combination of two instruments each adapted to indicate the voltage of a source of electric current, a thermocouple connected to one instrument arranged to be subjected to the temperature at a certain location, a second thermocouple connected to the other instrument and adapted to generate current whose voltage varies with the difference between the temperature at said location and the temperature at a second location, and means for combining the indications of said instruments into a single indication.

8. Apparatus for determining the transformation points of a specimen subjected to heat treatment comprising two instruments each adapted to indicate the voltage of a source of current, a thermocouple arranged to be subjected to the temperature of the specimen and connected to one of said instruments, a thermocouple adapted to develop voltage varying with the difference in temperature between the specimen and a neutral body and connected to the other instrument, and means for combining the indications of the two instruments.

9. Apparatus for determining the transformation points of a specimen subjected to heat treatment comprising two instruments each adapted to indicate voltage, a heating chamber in which the specimen is placed, a neutral body in said chamber, a thermocouple exposed to the temperature of the specimen and connected to one of said instruments, a series of thermocouples adapted to develop voltage varying with the difference of temperature between the specimen and the neutral body and connected to the other instrument, and means for combining the indications of said instruments.

10. In apparatus as set forth in claim 9, means for interrupting the application of heat to the heating chamber when a predetermined upper temperature limit has been reached.

11. In apparatus as set forth in claim 9, means for interrupting the operation of the indicating instruments when a predetermined lower temperature limit has been reached.

12. In apparatus as set forth in claim 9, the second thermocouple comprising a plurality of junctions in series having a given number subjected to the temperature of the specimen and the same member subjected to the temperature of the neutral body.

13. In apparatus as set forth in claim 9, the means for combining the indications comprising a record sheet, means for moving the same to an extent determined by the indications of one instrument, a marking device and means for moving the same, transversely of the movement of said sheet, to an extent determined by the indications of the other instrument.

In testimony whereof we affix our signatures.

ROLAND B. ALEXANDER.
WILLIAM HOWARD ROWAN.